Aug. 6, 1935.    H. ERNST ET AL    2,010,355
MACHINE TOOL
Filed Sept. 23, 1930    4 Sheets-Sheet 1
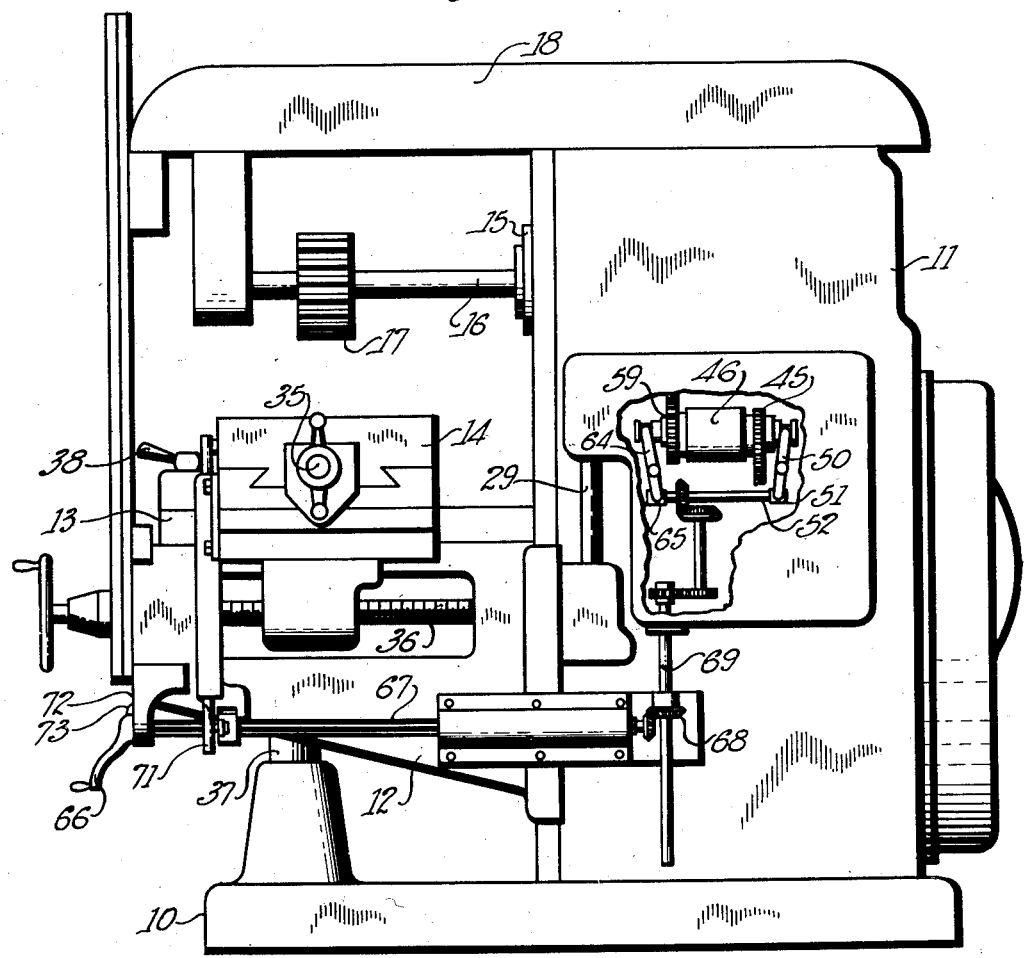
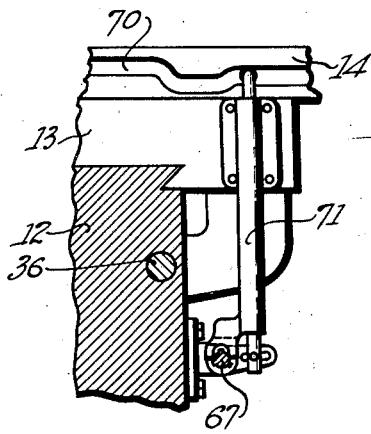
Inventors
HANS ERNST
LESTER F. HENNINGER
By A.K. Parsons
Attorney

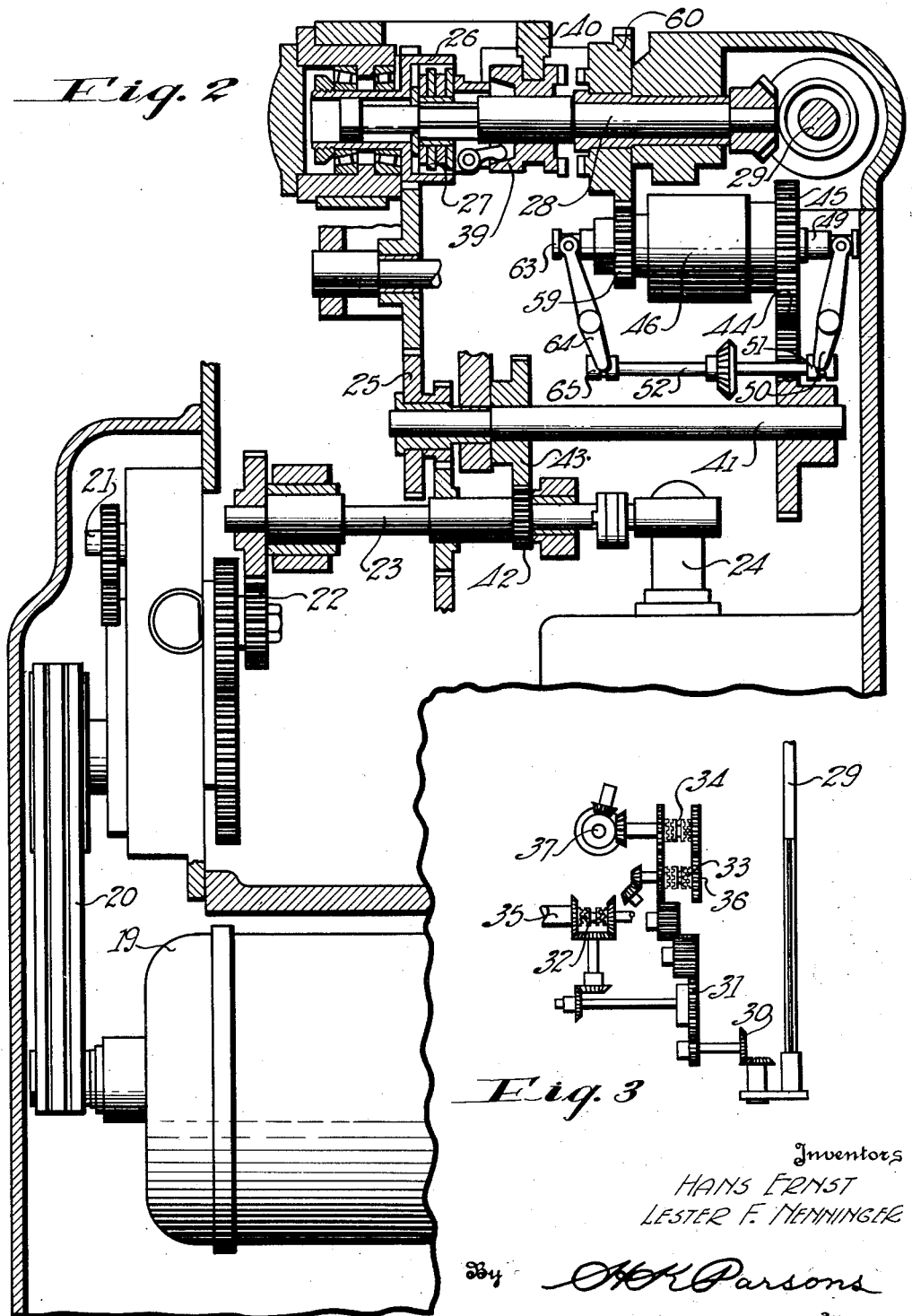

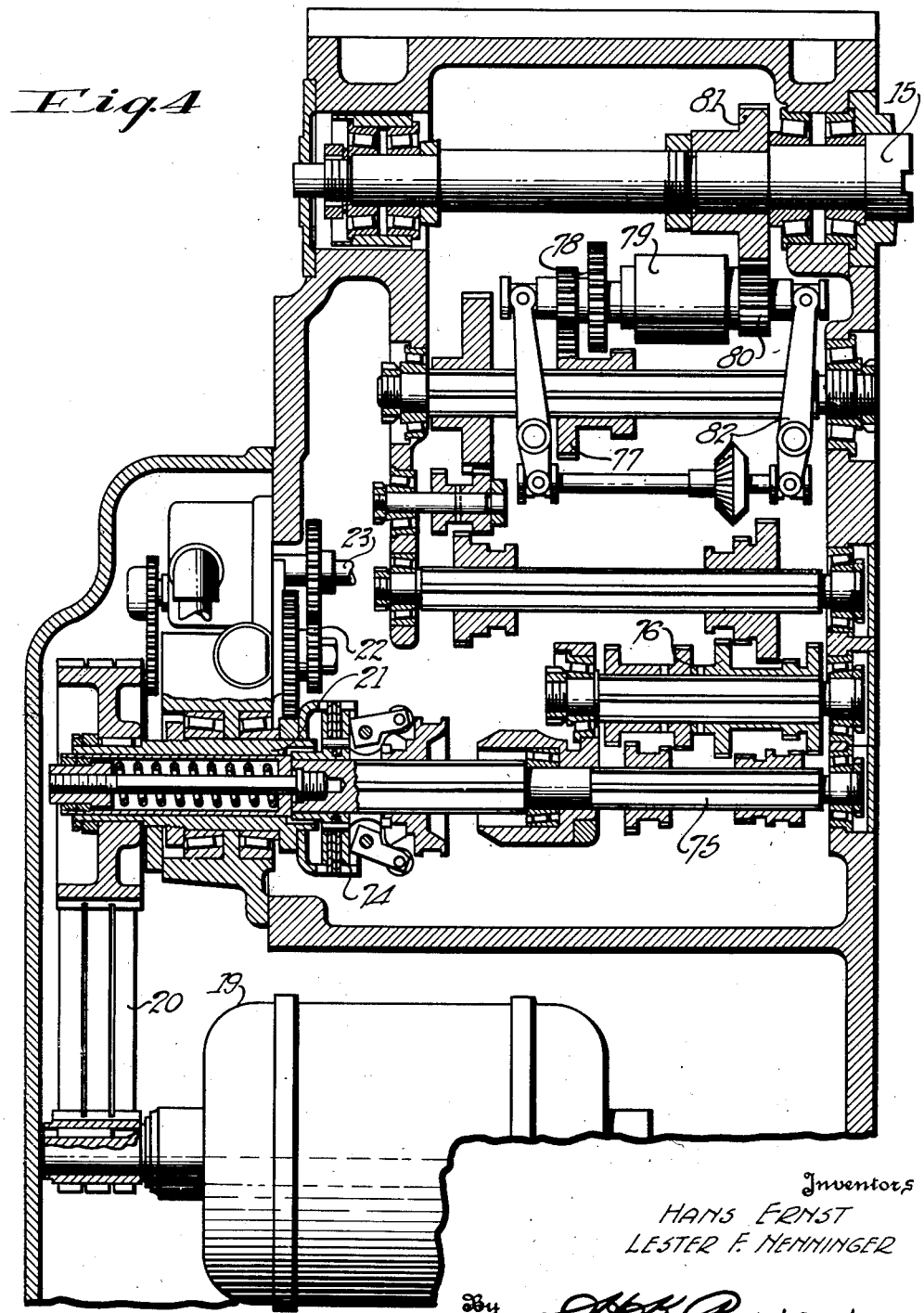

Aug. 6, 1935.　　　H. ERNST ET AL　　　2,010,355
MACHINE TOOL
Filed Sept. 23, 1930　　　4 Sheets-Sheet 4
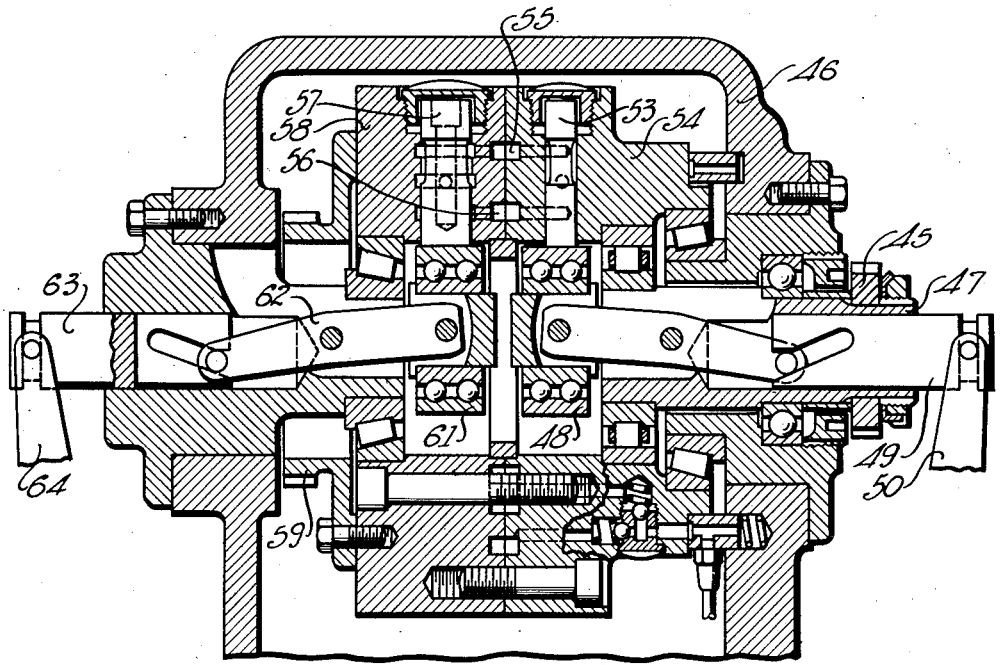
Fig. 6
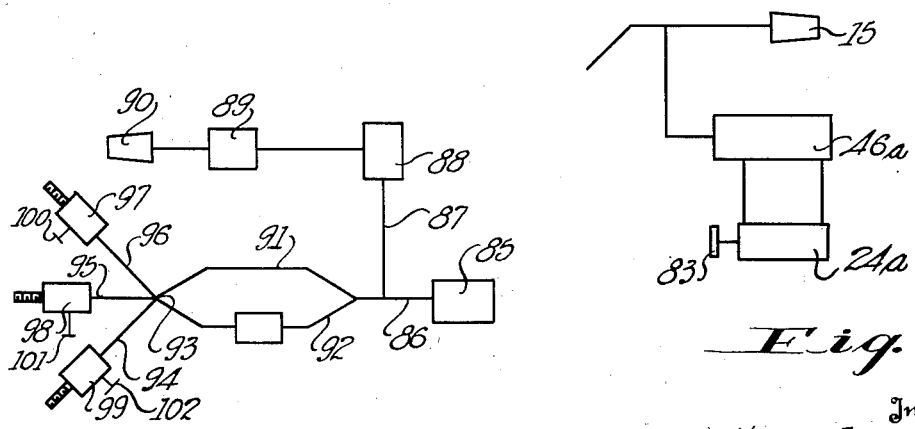
Fig. 8
Fig. 7
Inventors
HANS ERNST
LESTER F. MENNINGER
By H. K. Parsons
Attorney Patented Aug. 6, 1935

2,010,355

UNITED STATES PATENT OFFICE 2,010,355

MACHINE TOOL

Hans Ernst and Lester F. Nenninger, Cincinnati, Ohio, assignors to The Cincinnati Milling Machine Company, Cincinnati, Ohio, a corporation of Ohio Application September 23, 1930, Serial No. 483,861

12 Claims. (Cl. 90—21)

This invention relates to improvements in machine tools and has particular reference to the driving mechanism or transmission and the control thereof.

Prior to the present invention it has been customary in connection with machine tools such as milling machines to construct the same with a plurality of relatively translatable parts for effecting proper initial adjustment of the work and cutter, one with respect to the other, for operatively relating the same, and also to effect such relative shifting movements during the cutting or tooling operation to control the rate of stock removal and direction of shifting of the parts during such tooling.

In attainment of these results use has been made of various forms of final movers and suitable sliding gear transmissions employed to determine the final rates of movement of the individual parts. These mechanical gear transmissions have given quite a variable range of movement, but at times the rate is only an approximation of that most desirable for proper and efficient cutting due to the limitation of feed variations possible in mechanism of this nature, and such drives possess the additional disadvantage that the rate cannot, as a practical proposition, be satisfactorily varied during a continuous tooling operation.

One of the principal objects, therefore, of the present invention is the provision of a novel and improved transmission mechanism capable of utilization in connection with conventional milling machines or other machine tools which will provide an infinitely variable rate of drive for the several translatable elements thereof by variance not feasible throughout the normal range of rates, when entire dependence is placed on geared variable speed transmissions.

A further object of the present invention is the provision of an improved transmission drive mechanism and control which will make possible the variation in rate of shifting movement as desired during an individual tooling operation without checking the progress of the machine or necessitating shifting of gears, clutches, or the like.

A further object of the present invention is the provision of an improved mechanism which will make possible the actuation of the shiftable elements of a machine tool from a constant operating or fixed speed prime mover at either a rapid rate or a variably determinable slower or feeding rate and permit of desired increases and decreases in said feeding rate during uninterrupted movement of the actuated part.

Other objects and advantages of the present invention should be readily apparent by reference to the following specification considered in conjunction with the accompanying drawings forming a part thereof, and it will be understood that we may make any modifications in the specific structural details hereinafter disclosed, within the scope of the appended claims, without departing from or exceeding the spirit of the invention.

Figure 1 is a side elevation of a milling machine of the knee and column type embodying the present invention.

Figure 2 is an expanded view of the hydromechanical drive and speed variating mechanism as contained within the column portion of the machine, for effecting translation of certain of the units thereof.

Figure 3 is a diagrammatic view of the ultimate mechanical transmission for final drive of the shiftable parts.

Figure 4 is a view similar to Figure 2 illustrating the speed variation and drive connections to the tool actuating member or spindle of the machine.

Figure 5 is a fragmentary front view particularly illustrating the automatic speed control mechanism utilizable in connection with the present invention.

Figure 6 is a diagrammatic sectional view of the hydraulic speed variator, and

Figure 7 is a diagram showing utilization of a variable displacement pump for driving the hydraulic motor.

Figure 8 is a diagrammatic view of the complete milling machine transmission embodying the invention.

In the drawings, in which the invention has been shown as applied to a knee and column type of milling machine structure, the numeral 10 designates the base of a milling machine having rising therefrom the column 11 having slidably mounted on one face thereof the customary knee 12 translatably supporting the saddle 13 and table 14. Journaled in the upper portion of the column is the spindle 15 for the arbor 16 of cutter 17 which is braced from the overarm 18. It will thus be seen that the machine basically embodies a driven or rotating cutter spindle and means for supporting a work piece, such as the table 14, with the intervention of certain slide members for effecting a movement of the work piece support or table and cutter one toward the other in a vertical direction for lateral or in and out adjustment and for transverse shifting, it being understood that it is conventional practice and if preferred certain of these movements may be effected by a shifting of the cutter arbor and spindle in place of a shifting of the table itself.

Disposed within the column 11 is a prime mover 19 such as an electric motor, for driving pulley 20, and thus through shaft 21 the general power transmission mechanism contained within the column. This mechanism includes a gear train 22 to shaft 23 for operation of the pump 24. Extending from shaft 23 is a rapid traverse transmission 25 terminating in a member 26 couplable by clutch 27 with shaft 28 which in turn through suitable gearing, drives spline shaft 29 vertically disposed at the side of column 11. This spline shaft is normally utilized through gearing 30—31 and clutches 32, 3, and 34 to selectively actuate the table feed screw 35, saddle shifting screw 36, and the elevating screw 37 for the knee, in one direction or the other according to the position of the respective clutches, these being controlled by the customary clutch shift levers 38 located at suitable points on the machine.

Clutch member 27 is controlled by spool 39 alternatively movable through shifter 40 to couple shaft 28 with the feed transmission. This transmission, in the form illustrated in Figure 2, includes shaft 41 driven through pinion 42 on shaft 23 and meshing gear 43 on shaft 41, and a limited organized sliding gear transmission variator designated as an entirety by the numeral 44. Final drive from this transmission serves to rotate driven gear 45 of the hydraulic variator 46 shown in detail in Figure 6. It includes an outer casing having journaled in one end the spindle 47 rotated by gear 45 and slidably supporting the variable eccentric roller 48 whose eccentricity is controlled through the sliding cam 49 and lever 50 oscillated by cam 51 on the rotary or oscillatable controlled shaft 52. This roller bears against the pump plungers 53 of rotor 54. These plungers if oscillated by the eccentric roller tend to produce circulation of oil from channel 55 to channel 56 through the plunger valves 57 in a second rotor 58 having the drive gear 59 meshing with gear 60 couplable to operate shaft 28 by shifting of the spool 40. The position of the plunger valves 57 and their phased relationship to the plungers 53 is determined by adjustment of the second variable eccentric roller 61 controlled by lever 62, cam 63, and extraneous lever 64 actuated by cam 65 on shaft 52. The structure here described is a known form of hydraulic speed variator whose operation is not therefore further gone into detail at this point, it being sufficient to say that if the relationship of the members 53 and 57, as determined by the respective cam rollers 48 and 61, is such that there is no circulation of the oil or hydraulic medium through unit 58, this unit will be locked to turn in synchronism with unit 54, while to the extent that if a circulation of oil under the influence of the pump is permitted there will be a relative slip or speed variation between the parts so that the ratio of the rates of movement of the driven gear 45 and the driving gear 59 may be varied by infinitesimal increments from unity or a locked drive between the two rotors, to infinity, in which there is substantially no movement of the rotor 58 for the constant speed of rotation of member 54. To assist in this functioning of the speed variator, use is made of the pump 24 for maintaining the hydraulic medium in the fluid circulation system including channels 55—56.

From the foregoing it will be seen that there is thus provided a yielding or cushioned impositive drive connection between the transmission gearing 44 and the final unit drive shaft 29 in which an infinite number of blending speeds may be secured, while by utilization of the mechanical or sliding gear variable speed drive 44, the initial input rate at 45 may be stepped up or down as desired to vary the general possible range of speeds or modify the sensitivity required of an hydraulic transmission unit.

The actual control of the hydraulic variator 46 is preferably effected as by handle 66 on shaft 67 carried in the present instance by the knee and coupled through beveled gearing 68 to spline shaft 69 on the column for rotation or oscillation of shaft 52 and thus suitable oscillation of the cam controlling levers for operation of plungers 49 and 63.

In addition, and as particularly brought out in Figure 5, the table 14 or other translatable unit may be provided with a templet or cam 70. This serves through a linkage 71 carried by the saddle and slidable therewith along rod 67 to oscillate the rod and thus automatically effect desired changes in the feed rate during an individual tooling operation according to the amount of stock removal desired or other feature. Consequently the present mechanism lends itself very readily to an automatic feed rate control as well as to a normal manual determination of the rate at an individual moment by actuation of handle 66 in accordance with the rate dial 72 and indicator 73 on said handle.

As particularly illustrated in Figure 4, a clutch 74 determines the operative coupling of the drive shaft 21 with spline shaft 75 of the organized sliding gear variable speed transmission 76 terminating in a final drive member 77 for actuation of the driven gear 78 of a second hydraulic speed variator 79 corresponding in structure to the variator 46 previously described and having the final drive gear 80 meshing with the bull gear 81 of the spindle 15, and suitable actuating mechanism 82 being provided to vary the rate of power transmission of unit 79 and thus the rate of rotation of the cutter spindle.

While we have described a particular form of hydraulic speed variator for use in determining the final rate of translation of the several units of the machine as well as the rate of rotation of the cutter spindle member, it is to be understood that other types might be substituted. For example, there has been illustrated in Figure 7 in semi-diagrammatic form an embodiment of the invention in which the pump 24A corresponds in location and manner of drive to the pump 24, but is of conventional variable displacement type, its output being controlled by the adjusting member 83. This pump serves to effect circulation of hydraulic actuating medium, such as oil, through the variable hydraulic motor unit 46A without the intervention of drive gearing such as 44. In this instance, therefore, the initial variation of drive to the hydraulic motor unit is effected by a varying in the volumetric circulation effected by the pump 24A, while an additional speed adjustment is then effected by control of the variable hydraulic motor 46A.

It is further to be understood that the hydraulic speed variator unit, such as 46, may either be common to all of the translatable part shifting members as indicated in Figures 2 and 3 of the drawings, or may be individual thereto as is similarly the case with the spindle drive mechanism as illustrated in Figure 4. Such a transmission embodying individual hydraulic speed variators for the several units is diagrammatically illustrated in Figure 8. In this form of the invention it will be noted use is made of a common prime mover 85 and initial transmission line 86 shown as dividing into a first branch transmission 87 extending through organized speed variators 88 and 89 to a spindle 90 at least one of said variators being of the hydraulic type. Additionally, the transmission is shown as dividing into a rapid traverse line 91 and a feed controlled line 92 each coupled to a common transmission 93 in turn branching as at 94, 95, and 96 to the individual speed variators 97, 98, and 99 for the table, knee, and sadde respectively. These units being of the type just described having their individual speed control levers 100, 101, and 102 corresponding to the similar speed control lever 66 for example of the previously described unit, they are not believed to require further detailed description. Particular attention is invited to the fact that in this, as in the previously described forms of transmission drive, the rotation of the spindle and the movement of the individual units is determined through a cushioned hydraulic drive and final mechanical actuation of the determined part, and that variations are effected both in the general rate of drive to the hydraulic variator and in the final drive through said variator. A distinction present in the diagrammatically described form, however, resides in the fact that in this form of the invention the prime mover serves to actuate both the rapid traverse and the general feed variator unit, but that the special variators for movement of the individual units are so available that both the general feed and rapid traverse drives are through these units, making it possible to secure a desired adjustment or varied rapid traverse rate at any time as respects each individual unit and irrespective of the rapid traverse rates being imparted to the other units.

We claim:

1. A milling machine having a column, a cutter spindle journaled in the column, a work support mounted on the column for relative movement with respect to the spindle, means for effecting rotation of the spindle including a prime mover mounted in the column, transmission means extending to the spindle, a motion determining clutch interposed between the prime mover and transmission, said transmission including rotatable driving and driven parts, means coupling the driven part to the spindle, variable speed gearing connecting the driving part to the clutch, differential hydraulic mechanism for coupling the parts together to effect rotation of the spindle at the rate determined by said gearing, and means to vary said hydraulic coupling to vary said rate with respect to that determined by said gearing.

2. A milling machine having a column, a cutter spindle journaled in the column, a work support mounted on the column for relative movement with respect to the spindle, means for effecting rotation of the spindle including a prime mover mounted in the column, transmission means extending to the spindle, a clutch for coupling the prime mover to said transmission, said transmission including rotatable driving and driven parts, means coupling the driven part to the clutch, differential hydraulic mechanism for coupling the parts together to effect rotation of the spindle at the rate determined by said gearing, means to vary said hydraulic coupling to vary the rate of rotation of the spindle with respect to that determined by said gearing, and a pump for delivering at a constant rate pressure fluid to said hydraulic mechanism.

3. A milling machine having a column, a cutter spindle journaled in the column, a work support mounted on the column for relative movement with respect to the spindle, means for effecting rotation of the spindle including a prime mover mounted in the column, transmission means extending to the spindle, a clutch for coupling the prime mover to said transmission, said transmission including rotatable driving and driven parts, means coupling the driven part to the spindle, variable speed gearing connecting the driving part to the clutch, differential hydraulic mechanism for coupling the parts together to effect rotation of the spindle at the rate determined by said gearing, means to vary said hydraulic coupling to vary the rate of rotation of the spindle with respect to that determined by said gearing, a pump for supplying fluid under pressure at a predetermined rate to said hydraulic mechanism and a branch transmission constantly actuated by said prime mover for driving said pump.

4. A milling machine having a column, a cutter spindle journaled in the column, a work support mounted on the column for relative movement with respect to the spindle, means for effecting rotation of the spindle including a prime mover mounted in the column, transmission means extending to the spindle, a clutch for coupling the prime mover to said transmission, said transmission including rotatable driving and driven parts, means coupling the driven part to the spindle, variable speed gearing connecting the driving part to the clutch, differential hydraulic mechanism for coupling the parts together to effect rotation of the spindle at the rate determined by said gearing, means to vary said hydraulic coupling to vary the rate of rotation of the spindle with respect to that determined by said gearing, a variable displacement pump for supplying pressure to the hydraulic mechanism, a branch transmission constantly actuated by the prime mover for driving said pump, and means to vary the displacement of said pump to further vary the speed of said spindle.

5. A milling machine comprising a column, a cutter spindle journaled in the column, a work support carried thereby and movable relative to the spindle for feeding work pieces transversely thereof, a prime mover, a transmission for effecting said feeding movement including a feed transmission and a rapid traverse transmission coupled to the prime mover, a clutch for selectively coupling either of said transmissions to the support, said feed transmission including an hydraulic speed variator, means for adjusting said variator to change by infinitesimal amounts the rate of said feeding movements, an additional clutch for determining the direction of said feeding movement, means automatically controlled by the movement of said work support for varying the rate of movement thereof, and additional manually operated means for effecting said adjustment.

6. A milling machine having a column, a cutter spindle journaled in the column, a work support carried by the column for movement transversely of the spindle, means for effecting rotation of the spindle including a prime mover, an initial drive shaft, a clutch for selectively connecting the drive shaft to the prime mover, a shiftable gear transmission coupled to the drive shaft and terminating in a second shaft, a final drive gear attached to the cutter spindle, means coupling the second shaft to the spindle including an intermediate shaft operatively coupled to the second shaft and having a slidable gear thereon, a coupled pump and motor unit, said pump having a pair of different diameter gears secured thereto for selective engagement by the shiftable gear, said motor having a gear secured thereto in mesh with the spindle drive gear, means for adjusting the phase relation between the pump and motor whereby it will be ineffective on the rate transmitted by the gearing to the spindle and to other positions whereby it automatically becomes effective to infinitesimally vary the rate transmitted by the gearing to the spindle.

7. In a milling machine the combination with a rotatable tool spindle and a work holder of a plurality of relatively translatable members intervening the work holder and spindle for effecting desired relative shifting movements of the work holder for adjustment and tooling operations, means for effecting power actuation of the several parts at variable rates including a prime mover, a first branch transmission selectively couplable with the prime mover for actuation of the spindle, said transmission including an hydraulic speed variator for varying by infinitesimal increments the rate of rotation of the spindle, a second branch transmission driven by the prime mover, individual transmissions extending from the second branch transmission to the several translatable members for effecting desired power translation of the work holder, said second branch transmission including an hydraulic speed variator for varying by infinitesimal increments the rate of member movement, a third branch transmission, and pump means driven by the last named transmission for supplying pressure fluid to said hydraulic speed variators.

8. In a milling machine having a column, a tool spindle journaled in the column and a work support mounted on the column for relative movement with respect to the spindle, the combination of means for effecting said relative movement including a prime mover mounted in the column, transmission means extending from the prime mover for effecting said relative movement, said transmission including rotatable driving and driven parts, clutch means for coupling the driven part for movement of the table, a gear train connecting the driving part for continuous actuation by the prime mover, differential hydraulic mechanism for coupling said parts together to effect movement of the table at the rate determined by said gear train, and means to vary said hydraulic coupling to vary the rate with respect to that determined by the gear train.

9. In a milling machine having a column, a tool spindle journaled in the column and a work support mounted on the column for relative movement with respect to the spindle, the combination of means for effecting said relative movement including a prime mover mounted in the column, transmission means extending from the prime mover effecting said relative movement, said transmission including rotatable driving and driven parts, clutch means for coupling the driven part for movement of the table, a gear train connecting the driving part for continuous actuation by the prime mover, a differential hydraulic mechanism for coupling said parts together to effect movement of the table at the rate determined by said gear train, means to vary said hydraulic coupling to vary the rate with respect to that determined by the gear train, a branch transmission continuously driven by the prime mover, and a pump driven by said branch transmission for supplying fluid to said hydraulic mechanism.

10. A milling machine having a support, a work holder and a tool holder mounted on the support for relative movement, translatable support members intervening the holders for relative adjustment therebetween, a prime mover, a first transmission extending from the prime mover to the tool support for actuation thereof, a second and a third transmission extending from the prime mover and operable thereby to yield a feed rate, and a rapid traverse rate respectively, branch transmissions individual to the several translatable support members, means for selectively coupling the branch transmissions with the second or third transmission, each of said branch transmissions including an organized rate varying mechanism whereby the feed rate and the rapid traverse rate yielded by the second and third transmission may be varied to produce different effects in the several translatable support members.

11. A milling machine having a support, a work holder and a tool holder mounted on the support for relative movement, translatable support members intervening the holders for relative adjustment therebetween, a prime mover, a first transmission extending from the prime mover to the tool support for actuation thereof, a second and a third transmission extending from the prime mover and operable thereby to yield a feed rate, and a rapid traverse rate respectively, branch transmissions individual to the several translatable support members, means for coupling the several branch transmissions in the same or different ratios with the second and third transmissions whereby the same or different feed and rapid traverse rates will be imparted to the different support members for the same yielded rates of the second and third transmission.

12. A milling machine having a support, a work holder and a tool holder mounted on the support for relative movement, translatable support members intervening the holders for relative adjustment therebetween, a prime mover, a first transmission extending from the prime mover to the tool support for actuation thereof, a second and a third transmission extending from the prime mover and operable thereby to yield a feed rate and a rapid traverse rate respectively, branch transmissions individual to the several translatable support members, individual hydraulic speed gears for coupling the several translatable support members to the second and third transmissions, individual means for adjusting the respective hydraulic speed gears to produce a plurality of feed rates, and a plurality of rapid traverse rates individually different as respects the different support members.

HANS ERNST.
LESTER F. NENNINGER.